H. TRILLICH.
EXTRACTING CAFFEIN FROM WHOLE COFFEE BEANS.
APPLICATION FILED APR. 15, 1909.
953,074.
Patented Mar. 29, 1910.
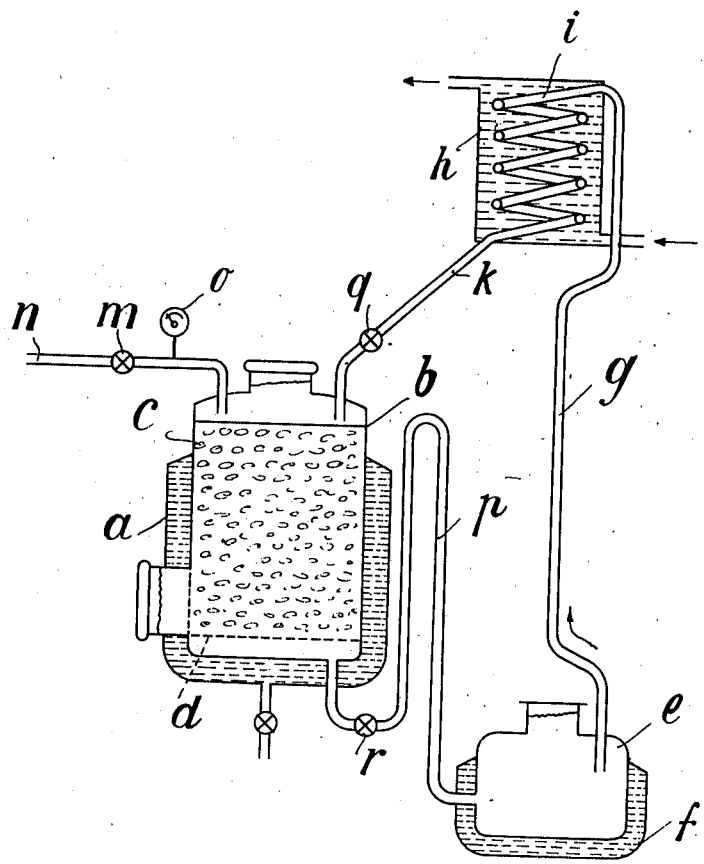
Witnesses
Inventor
Heinrich Trillich
by Nicholas L. Bogan
Attorney

UNITED STATES PATENT OFFICE.

HEINRICH TRILLICH, OF MUNICH, GERMANY.

EXTRACTING CAFFEIN FROM WHOLE COFFEE-BEANS.

953,074. Specification of Letters Patent. Patented Mar. 29, 1910.

Application filed April 15, 1909. Serial No. 490,164.

*To all whom it may concern:*

Be it known that I, HEINRICH TRILLICH, a subject of the King of Bavaria, residing at 21 Prinzregentenplatz, Munich, Bavaria, Germany, have invented a new and useful Method of Extracting Caffein from Whole Coffee-Beans, of which the following is a specification.

My invention relates to a method of freeing coffee beans from alkaloid.

As is well known, the dissolvents for extracting caffein from coffee beans can with the usual methods extract only a fraction of the caffein. The reason for this resides in the fact, that the caffein is partly present in a hardly soluble combination, and also in the fact, that the horny condition of the cell-walls of the coffee beans, more particularly the outer cell-layers of the same, render it difficult for the dissolvent to penetrate into the beans and to be removed therefrom. It is known to liberate caffein by means of ammonia or other bases in order to facilitate the extraction of the caffein before treating the coffee beans with dissolvents. However, in such case still considerable quantities of caffein will remain in the beans, even after a long continued extraction.

In the method according to my invention the extraction of the caffein is effected in a manner, that the coffee beans are first treated with a suitable volatilizable acid adapted to soften the cellulose, after which the caffein is extracted by means of chloroform or other suitable dissolvent. By the treatment of the coffee beans with a volatilizable acid, more particularly acetic acid or sulfurous acid, not only are the cell-walls softened, but also the hardly soluble combination containing the caffein is turned into a readily soluble one. The extraction of the caffein from the treated coffee beans is then effected in the usual manner by the known extractors. The acid, by means of which the cells of the coffee beans are opened, can be employed either in a watery solution or in the condition of vapor and when the coffee beans are treated under pressure the action of the acid will be increased.

When the coffee beans have been treated with a dissolvent and their alkaloid has been extracted, the dissolvent and the residue of the acid, if any, are removed by evaporation. Previous to the evaporation also a subsequent extraction of the caffein by means of alcohol or other suitable solvent may take place, in order to facilitate the separation of the acid. The coffee beans after being subjected to a dissolvent are then completely dried and roasted in the usual manner.

As dissolvents for treating the coffee beans, chloroform, benzin, benzol, tetrachloro-carbon, as well as acetic ether can be employed.

As showing, by way of example, one form of an apparatus in which a process in accordance with this invention can be carried out, reference is had to the accompanying drawings which illustrate the apparatus in vertical section.

Referring to the drawing, $b$ denotes an extraction vessel surrounded by heating jacket $a$ and is furthermore provided near its bottom with a sieve $d$. The vessel $b$ is adapted to receive the coffee beans $c$. Communicating with the bottom of the vessel $b$ is a siphon conduit $p$ which opens into the still $e$, and the latter being surrounded by the heating jacket $f$. Projecting from the still $e$ is a pipe $g$ which opens at its upper end in a coil $i$ mounted in a cooler $h$. The coil $i$ is connected with the upper end of the vessel $b$ by a pipe $k$ provided with a cut-off $q$. Projecting from the upper end of the vessel $b$ is an outlet pipe $n$ having a cut-off $m$ and interposed between the cut-off $m$ and the vessel $b$ is a pressure gage $o$.

The extracting medium flows from the coil $i$ into the receptacle $b$ and onto the beans $c$ and is carried over by the siphon conduit $p$ into the still $e$, from which it extends up the pipe $g$ and returns to the coil $i$. The conduit pipe $p$ is provided with a cut-off $r$. If the cut-offs $m$, $q$, and $r$ are closed, there can be generated in the vessel $b$ by the heating thereof through the medium of a heating jacket $a$, a sufficiently high internal pressure for use in connection with the method. The pressure can be indicated by the gage $o$. By opening the cut-off $m$ the pressure within the vessel $b$ can be regulated.

I claim:

A method of freeing whole coffee beans from caffein which consists in softening their cellulose and changing the hardly soluble combinations containing caffein into readily soluble ones by subjecting the whole coffee beans to acetic acid whereby the separation of the caffein from the beans is facilitated, then extracting the caffein from the treated beans by subjecting them to acetic ether. and then removing the residue of the solvent and of the acid from the beans by separation.

In testimony whereof I affix my signature.

HEINRICH TRILLICH.

In the presence of—
    LOUIS MUELLER,
    MATHILDE K. HELD.